(12) United States Patent
Meissner et al.

(10) Patent No.: US 8,651,349 B2
(45) Date of Patent: Feb. 18, 2014

(54) ATTACHMENT DEVICE FOR A ROOF RACK

(75) Inventors: Michael Meissner, Kapelle (NL); Joost Marinus Van Rooijen, Kapelle (NL); Oscar Toetenel, Rotterdam (NL)

(73) Assignee: Hapro International B.V., Kapelle (NL)

( * ) Notice: Subject to any disclaimer, the term of this patent is extended or adjusted under 35 U.S.C. 154(b) by 443 days.

(21) Appl. No.: 12/901,786

(22) Filed: Oct. 11, 2010

(65) Prior Publication Data
US 2011/0084103 A1 Apr. 14, 2011

(30) Foreign Application Priority Data
Oct. 12, 2009 (NL) .................................. 1037386

(51) Int. Cl.
*B60R 9/055* (2006.01)
*B60R 9/048* (2006.01)

(52) U.S. Cl.
USPC ........... 224/319; 224/328; 224/331; 224/315; 224/570; 296/3; 296/6; 248/292.12; 248/231.41

(58) Field of Classification Search
USPC ......... 224/319–323, 329–331, 328, 558, 570; 248/316.4, 285.1, 286.1, 292.12, 248/346.07, 670, 228.3, 230.3, 231.41, 248/229.22, 229.12; 296/3, 6, 43, 143, 249
IPC .......................... B60R 9/055,9/058; F16B 2/12
See application file for complete search history.

(56) References Cited

U.S. PATENT DOCUMENTS

| | | | |
|---|---|---|---|
| 1,912,287 A * | 5/1933 | Lundell ....................... | 248/285.1 |
| 5,769,292 A | 6/1998 | Cucheran et al. | |
| 6,256,387 B1 * | 7/2001 | Wang ............................. | 379/446 |
| 6,296,161 B1 * | 10/2001 | Van der Feen et al. ....... | 224/319 |
| 6,918,521 B2 * | 7/2005 | Settelmayer et al. ......... | 224/319 |
| 7,111,764 B2 * | 9/2006 | Smith et al. ................... | 224/319 |
| 7,416,098 B2 * | 8/2008 | Settelmayer et al. ......... | 224/319 |

(Continued)

FOREIGN PATENT DOCUMENTS

| | | |
|---|---|---|
| DE | 3243878 A1 * | 5/1984 |
| DE | 19927429 | 12/1999 |

(Continued)

OTHER PUBLICATIONS

Translation of DE 3243878 A1.*

(Continued)

*Primary Examiner* — Nathan J Newhouse
*Assistant Examiner* — Todd Anderson
(74) *Attorney, Agent, or Firm* — Rankin, Hill & Clark LLP

(57) ABSTRACT

The present invention relates to an attachment device by means of which, in use, an object is attached to a roof rack which is or at least can be connected to roof rails of a car, comprising a housing, at least two movable jaws extending to outside the housing, which jaws engage round a roof rack in use, and actuating means provided with an operating element for moving said at least two jaws together, wherein the actuating means are designed to translate the jaws and comprise at least one rack, which rack is engaged when the operating element is operated. The invention further relates to a combination of a roof rack and such an attachment device and to a combination of an object to be attached to a roof rack and such an attachment device.

22 Claims, 3 Drawing Sheets

(56) References Cited

U.S. PATENT DOCUMENTS

| | | | |
|---|---|---|---|
| 7,503,470 B2 * | 3/2009 | Settelmayer et al. | 224/319 |
| 7,637,405 B2 * | 12/2009 | Emmerling et al. | 224/319 |
| 8,074,851 B2 * | 12/2011 | Settelmayer et al. | 224/319 |
| 2005/0098595 A1 | 5/2005 | Smith et al. | |
| 2005/0274756 A1 * | 12/2005 | Seys | 224/319 |
| 2008/0034561 A1 * | 2/2008 | Emmerling et al. | 24/514 |
| 2009/0184189 A1 * | 7/2009 | Soderberg et al. | 242/395 |

FOREIGN PATENT DOCUMENTS

| | | |
|---|---|---|
| DE | 102004045137 | 3/2006 |
| EP | 1338474 | 8/2003 |
| WO | 8809273 | 12/1988 |
| WO | 0208019 | 1/2002 |
| WO | 2007085748 | 8/2007 |
| WO | WO 2007085748 A1 * | 8/2007 |
| WO | WO 2011102780 A1 * | 8/2011 |

OTHER PUBLICATIONS

Search Report and Opinion Dated Jun. 14, 2010.
European Search Report of EP 10 18 6397 dated Jan. 12, 2012.

* cited by examiner

ATTACHMENT DEVICE FOR A ROOF RACK

The present invention, according to a first aspect thereof, relates to an attachment device by means of which, in use, an object is attached to a roof rack which is or at least can be connected to roof rails of a car, comprising a housing, at least two movable jaws extending to outside the housing, which jaws engage round a roof rack in use, and actuating means provided with an operating element for moving said at least two jaws together.

Such a device is known from EP 1 338 474 A1. In the known device, connecting portions of the jaws extend through the housing and are provided with hooks at the upper side, via which hooks said jaws are suspended from a disc which is circumferentially provided with external screw thread. An operating element in the form of a round cover provided with internal screw thread is supported on the upper side of the housing and engages the external screw thread of the disc with its internal screw thread. On account of the threaded connection in the cap, rotation of the cover causes the disc to be moved substantially in vertical direction, with the jaws suspended from the disc following said movement. The connecting portions of the jaws exhibit a curvature such that they are pivoted towards each other as the jaws are pulled further upwards through the housing. Without said curvature, or at least an inward driving force, the jaws could move laterally apart again, which would lead to an unreliable fixation. When the known device is attached to a roof rack, the jaws must be pivoted apart in lateral direction so as to make space for placing the jaws in vertical direction over the roof rack. During said placement, the jaws initially take up a low position. Subsequently, upon rotation of the cap, the jaws are pulled up and pivoted towards each other, so that the roof rack is clamped between the jaws on the one hand and between the jaws and the underside of the housing on the other hand.

International patent application WO 2007/085748 A1 describes a comparable fixation device. When a user rotates the threaded operating element, an actuating element thereof, which is locked against rotation, is pulled into or pushed out of contact with the roof rack. Also in this case, the movement of the jaws is a combination of a vertical translation and a pivoting movement.

U.S. Pat. No. 5,769,292 describes a clamping device for fixing a securing implement for an object yet to be provided to a support bar extending between roof rails of a vehicle. The clamping device includes two body portions, which can be moved one into the other and which each include a jaw. The first and the second body portion are clamped over a support bar through the use of a bolt and a fastening nut. A pair of elongated, slot-like openings are formed in the upper side of each of the two body portions for additionally securing the body portions. A pair of additional openings are formed in the second body portion. Via said openings, an object can be attached to the a clamping device attached to a roof rack.

The known devices have the drawback that the jaws and the connecting means must be designed for use with a specific roof rack in order to ensure a reliable clamping action of the attachment device, in other words, the known attachment device is not at all universally usable and/or has the drawback that fitting or removing the attachment device is relatively labourious.

Accordingly it is an object of the present invention, according to a first aspect thereof, to provide an attachment device as described in the introduction which is of a more universal nature than the known roof rack and/or which is easier to fit and remove than the known devices. According to the present invention, this object is accomplished in that the actuating means are designed to translate the jaws and comprise at least one rack, which rack is engaged when the operating element is operated. Unless specifically mentioned otherwise, in the present document the direction of movement of parts is in all cases related to the operational position, i.e. the position in which the attachment device is fitted to a roof rack. In the fitted position, the operating element can continuously engage said at least one rack in use. The operating element is operated when the attachment device is being fitted or removed, so that a force is transmitted to said at least one rack, as a result of which said at least one rack is moved in the corresponding direction, causing the jaws of the clamping device to be moved together or apart, respectively. As a result of said translating movement, the jaws engage a roof rack sideways, irrespective of the width, upon being fitted, clamping the roof rack between them. This process is simpler than in the case of the known attachment device, because the clamping movement is perpendicular to the fitting movement. The known attachment device is placed over the roof rack from the top down and is also clamped in place by vertical movement of the jaws relative to the housing. A pivoting movement, which is required in the case of the known attachment device for moving the jaws round the roof rack, is not required in the case of the attachment device according to the invention. Various actuating devices are known for actuating the jaws, a few of which will be discussed hereinafter. Although one of the actuating devices discussed below is very advantageous and consequently preferred, also other actuating systems are conceivable for causing the jaws to translate in horizontal direction.

In a preferred embodiment of the present invention, the actuating means comprise at least one rack, which rack is engaged by operating the operating element. Using a rack, preferably a rack in which the teeth are linearly aligned, a translating movement can be generated in a simple manner. Furthermore, a rack can be of solid construction, so that the device will be relatively insensitive to damage. The operating element may directly or indirectly engage the rack.

A user-friendly and compact attachment device is provided if the operating element comprises a rotary knob provided with engaging means which, in use, engage said at least one rack. Thus it is possible to convert a rotary movement of the operating element into a translatory movement of said at least one rack. The operation of a rotary knob as the operating element requires little space, because the rotary knob, although being rotatable, will be positioned at the same location at all times.

In a preferred embodiment, the rotary knob is rotatable about a substantially horizontal plane, and the rotary knob comprises a spiral guide which engages said at least one rack. The rotary knob may thus be positioned directly above the rack, with a spiral guide provided on the underside of the knob in question engaging the rack, causing said rack to translate upon rotation of the knob. The rotary knob can thus be oriented in a flat plane near the roof rack, for example in the case of a roof cargo box wherein the bottom of the cargo box in question is located between the knob as the operating element and the roof rack, and wherein the knob rotates in a plane parallel to the bottom of the cargo box, so that the attachment device will take up relatively little effective space.

In an alternative embodiment, the rotary knob is rotatable in a substantially vertical plane, the outer circumference of said knob being provided with teeth which engage said at least one rack. The rotary knob is thus oriented in a vertical plane near the attachment, whilst the knob, in use, may be positioned near the side wall of the roof cargo box in question.

If each of said at least two jaws is connected to a rack, which rack is engaged when the operating element is operated, the two jaws can be driven towards or away from each other. This makes it possible to move the jaws together more quickly than is the case with a device in which only one jaw is driven by a rack.

To realise a solid engagement of the jaws on a roof rack, it is preferable if the spacing in horizontal direction between the jaws decreases in downward direction. Furthermore preferably, the facing sides of the jaws are concave in shape, so that the jaws will exert a clamping force not only in horizontal direction but also in vertical direction on a roof rack upon engaging the roof rack in question.

To prevent unintentional detachment of the attachment device, it is preferable if the operating element comprises locking means by which the operating element can be locked in a desired position. In this way the jaws are prevented from being moved apart by a vibrating movement, for example while driving, as a result of which the clamping force being exerted on the roof rack will decrease.

It is preferable if the attachment device is designed to engage both the roof rack and an object to be attached to the roof rack with its jaws upon being placed. The attachment device must in that case be detached from an attached object in order to be removed. This has the advantage that the roof rack only has an attachment device attached thereto when an object is actually attached to the roof rack by means of said attachment device. In this way the aerodynamics are not unnecessarily affected by the attachment device. Preferably, the attachment device comprises a quick-action coupling for repeated attachment and detachment of the attachment device.

According to a second aspect thereof, the present invention relates to a combination of an object to be attached to a roof rack, which is or at least is to be connected to roof rails of a car and an attachment device according to the first aspect of the present invention, wherein the housing is positioned in or over the object in use, and wherein the jaws of the attachment device extending through the object to below said object for engaging a roof rack.

In a preferred embodiment of the present invention, the object comprises a roof cargo box. The attachment device is located on the bottom of the cargo box in use, and the jaws of the attachment device clamp the bottom of the cargo box onto a roof rack.

In an alternative embodiment, the object to be attached to a roof rack may comprise a bicycle carrier, in which case the attachment device will engage the upper side of the bicycle carrier, for example, thus clamping the bicycle carrier down onto a roof rack.

Many alternative objects can of course be attached to a roof rack by means of an attachment device according to the first aspect of the present invention.

According to a third aspect thereof, the present invention relates to a combination of a roof rack which is or at least is to be connected to roof rails of a car and an attachment device according to the first aspect of the invention. Such a combination is suitable for attaching any suitable object to the roof rack. The advantage of combining an object to be attached to a roof rack and one or more attachment devices according to the first aspect of the present invention is that various objects can be attached to the roof rack in a simple and safe manner.

The present invention will now be discussed in more detail on the basis of a preferred embodiment of the present invention with reference to the following figures, in which.

Figure 1:
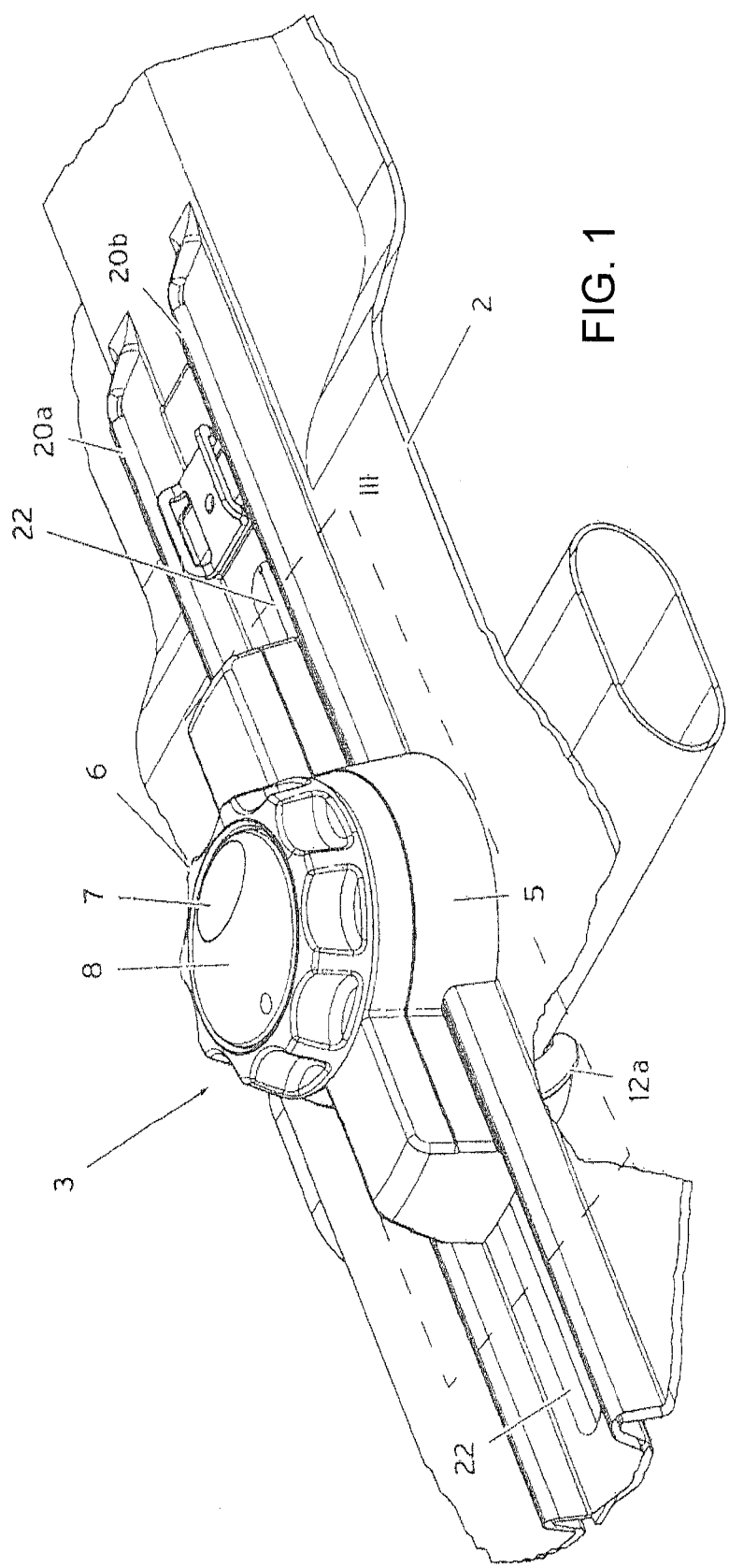
FIG. 1 is a perspective view of a part of a roof cargo box attached to a roof rack by means of an attachment device according to the present invention.

With reference now to FIG. 1, there is shown a perspective view of a part of a roof rack 1 and a part of a roof cargo box 2, which are connected together by means of an attachment device 3 according to the present invention. Jaws 4a, 4b and engage the roof rack 1 from the upper housing part 5 through the roof cargo box 2. A rotary knob 6 is provided on the upper housing part 5, which rotary knob is provided with a cover 8 with a tiltable lip 7.

Figure 2:
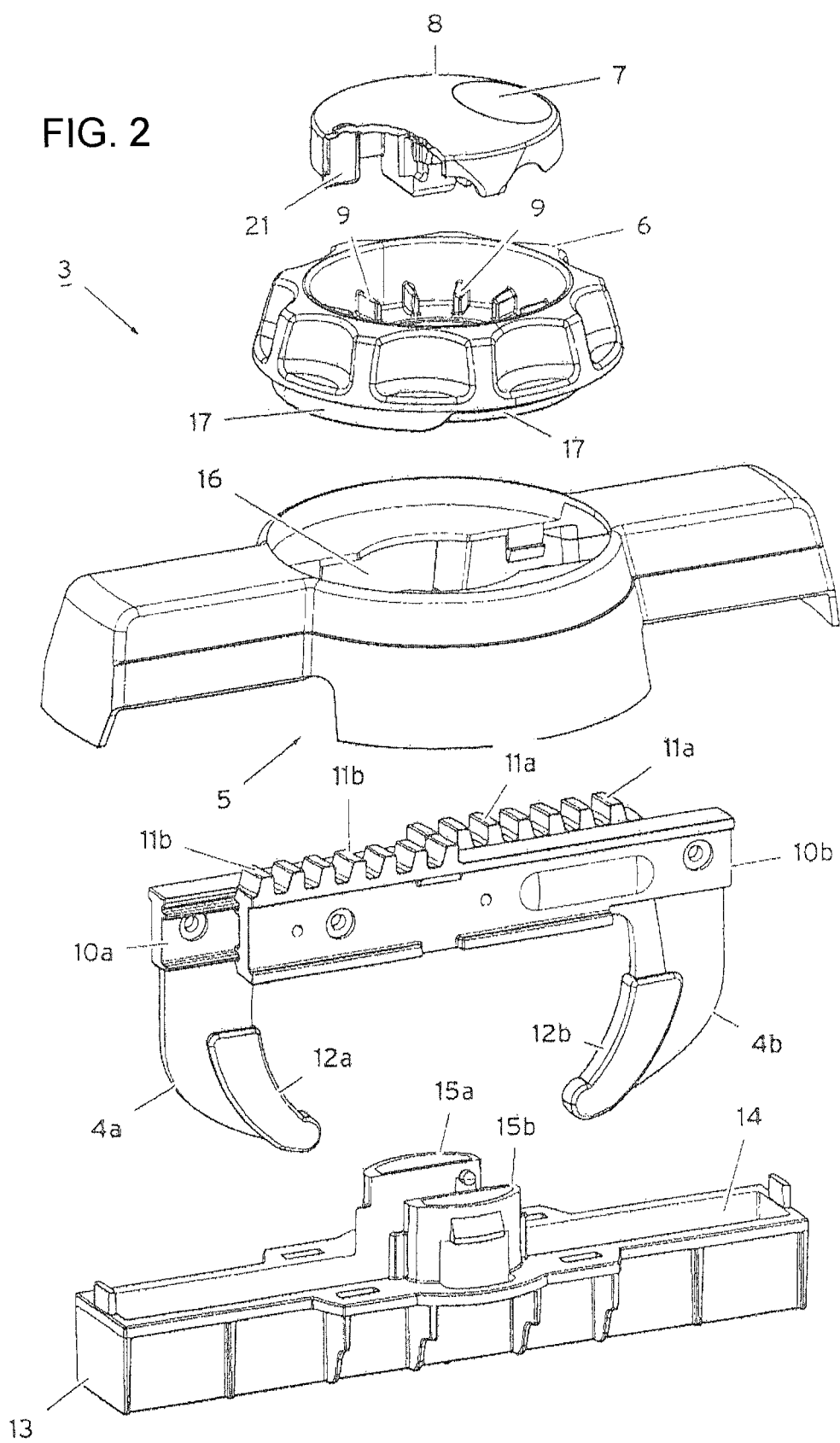
FIG. 2 is an exploded view of the attachment device of FIG. 1.

FIG. 2 is an exploded view of the attachment device 3 of FIG. 1, showing (in partially cutaway view in FIG. 2) a cover 8, which is provided with a tiltable lip 7. A projecting pin 21 is visible through the cutaway part of the circumferential edge of the cover 8. The cover 8 can be placed on the rotary knob 6, which is internally provided with projections 9. Present thereunder is the upper housing part 5, which houses two racks 10a, 10b provided with teeth 11a, 11b and jaws 4a, 4b. The jaws 4a, 4b are provided with a protective cover 12a, 12b. A lower housing part 13 has an outer circumference designed to mate with the inner wall of the upper housing part 5. The lower housing part 13 has a slot 14 for accommodating the racks 11a and 11b and upwardly extending parts 15a, 15b, which are to be received in a recess 16 in the upper housing part 5.

Figure 3:
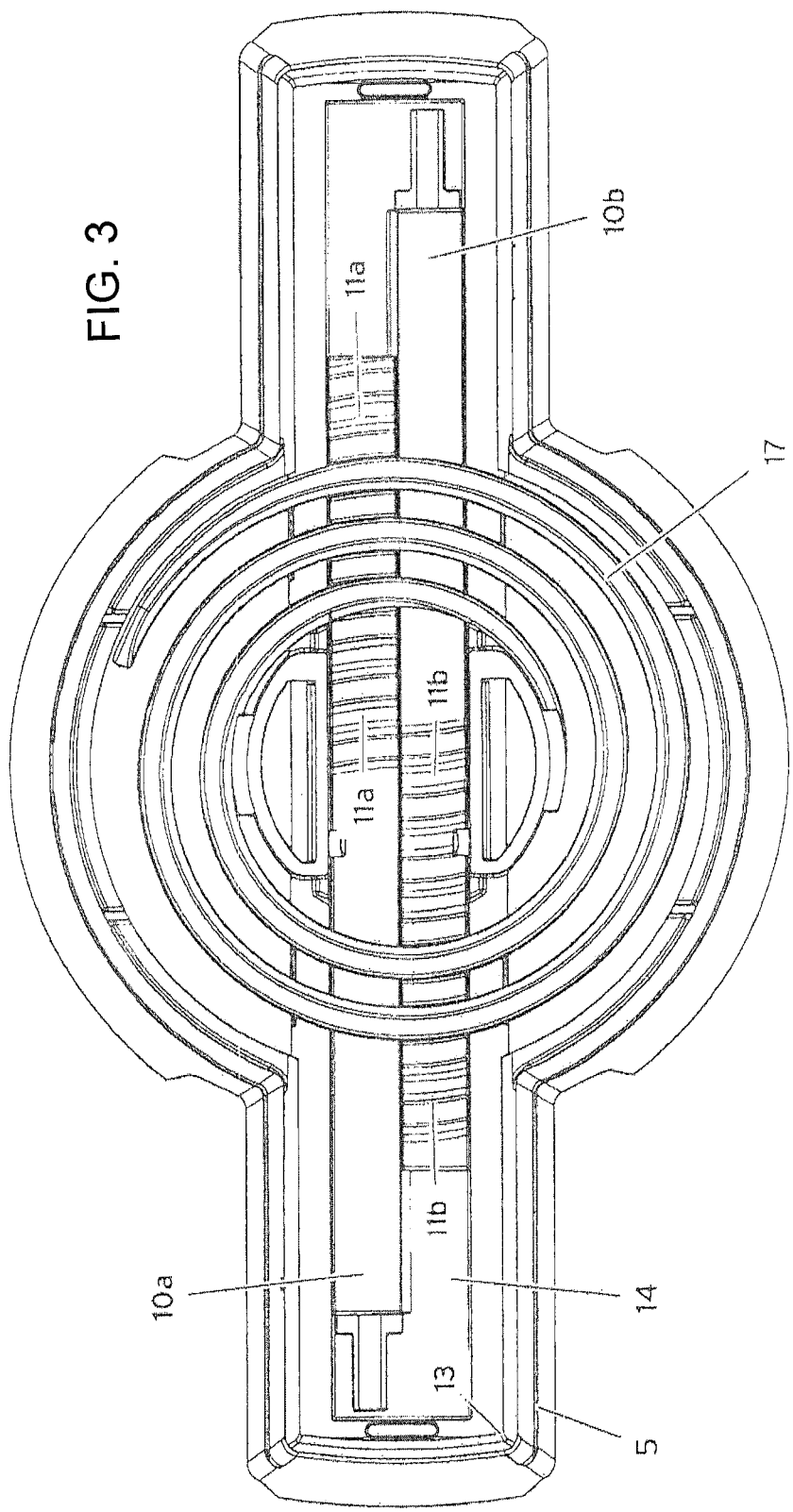
FIG. 3 is a cross-sectional view of the attachment device of figure

FIG. 3 is a cross-sectional view according to the line of the attachment device of FIG. 1 with the upper housing part 5, the lower housing part 13 with the slot 14, in which racks 10a, 10b having teeth 11a and 11b, respectively, are accommodated. A spiral guide 17 extends downwards from the rotary knob 6 (not shown in FIG. 3).

With reference now to FIGS. 1, 2 and 3, the operation of the attachment device 3 will be explained in more detail. The roof rack 1, only part of which is shown in FIG. 1, is connected to the roof rails (not shown) of a car in a conventional manner. A roof cargo box 2, only part of which is shown in FIG. 1, is firmly and securely attached to the roof rails of the car via the roof rack 1. A roof cargo box typically comprises four points of attachment where the roof cargo box is attached to two different roof racks 1. Only one such attachment 3 is shown in FIG. 1, because the attachment devices 3 are at least substantially identical to each other. To realise said attachment, an attachment device 3 is used, an exploded view of which is shown in FIG. 2. The jaws 4a, 4b are accommodated in the housing formed by the lower housing part 13 and the upper housing part 5. The lower edge of the lower housing part 3 substantially coincides with the elevated lower edge of the upper housing part 5. Furthermore, projecting parts 15e, 15b of the lower housing part 3 are received in the recess 16 of the upper housing part 5 in a form-locked manner on their curved circumferential side. The slot 14 in the lower housing part 13 is interrupted in the centre at the bottom side, so that the racks 10, 10b are supported on the centre portion thus formed, with the jaws 4a, 4b projecting from the lower housing part 13 at the bottom side thereof. Provided on the upper housing part 5 is a rotary knob 6, which, as is shown in FIG. 3, comprises a spiral shaped guide edge 17, which projects from the rotary knob 6 at the bottom side thereof. As is shown in FIG. 3, the spiral shaped guide 17 is received between teeth 11a, 11b of the racks 10a and 10b, respectively. When seen from below (see FIG. 3) the rotary knob 6 is rotated in anti-clockwise direction, the spiral guide 17 will drive the racks 10a, 10b inwards. Conversely, rotation of the rotary knob 6 in clockwise direction will result in the racks 10a, 10b being driven upwards. The knob 6 is furthermore provided with projections 9, which extend upwards into an internal space of the rotary knob 6. In use, the rotary knob 6 is closed by the cover 8, which is provided with the tiltable lip 7. When the lip 7 is tilted from the position shown by being depressed, it comes to be positioned between two adjacent projections 9, thereby preventing the projections 9 from moving and thus the rotary knob 6 from being rotated any further. After all, the lip 21 of the cover 8 is positioned between the projecting parts 15a, 15b of the lower housing part 13 in use, so that the cover 8 is fixed against rotation.

When a roof rack 1 is attached to roof rails of a car (this is not necessary, although it is the usual method of operation), a roof cargo box 2 can be placed on the roof rack 1, with a slot 22 in the roof cargo box crossing the roof rack 1. The attachment device 3 can then be placed over the roof rack 1 through the slot in the roof cargo box 2 with the racks 10a, 10b moved apart (i.e. the jaws 4a, 4b are located near the ends of the housing 5, 13). The lower housing part 5 of the attachment device 3 is supported on the bottom in that position, and in this case also on the upright edges 20a, 22b of the roof cargo box 2. By rotating the rotary knob 6 in anti-clockwise direction, the racks 10a, 10b are caused to move in inward direction as a result of the engagement of the spiral shaped guide 17 between the teeth 11a, 11b of the racks 10a and 10b, respectively, as a result of which the jaws 4a, 4b will move in the direction of the roof rack 1 in the slot 22. At some point the jaws 4a, 4b, or at least the protective covers 12a, 12b thereof, will come into contact with the roof rack 1. As a result of the concave shape of the jaws 4a, 4b and their protective covers 12a, 12b, the roof rack 1 will be firmly clamped between the jaws 4a, 4b upon further rotation in anti-clockwise direction. Furthermore, the housing 5, 13 is pulled downwards relative to the jaws 4a, 4b, as a result of which the roof cargo box 2 is clamped between the housing 5, 13 and the roof rack 1. In this way a strong and secure attachment of the roof cargo box 2 to the roof rack 1 is realised. When the jaws 4a, 4b are in the correct clamping position, the tiltable lip 7 is depressed, as a result of which the rotary knob 6 is locked against rotation, so that the attachment device 3 cannot unintentionally become detached. When the roof cargo box 2 is to be removed, the rotary knob 6 can be rotated in clockwise direction after the tiltable lip 7 has been tilted back to the starting position, causing the jaws 4a, 4b to be driven apart in the slot 22 until there is sufficient space between the ends of the jaws 4a, 4b for moving the attachment device 3 upwards over the roof rack 1 for the purpose of removing the attachment device 3.

In the appended figures and the above description, the present invention has been shown and described on the basis of only one embodiment of an attachment device according to the present invention. It will be understood that many variants, which may or may not be obvious to those skilled in the art, are conceivable and possible within the scope of the present invention, which is defined in the appended claims. Neither the description nor the figures have a limitative effect thereon. Thus it is possible, for example, to use a higher housing, in which a rotary knob provided with external teeth is accommodated, being rotatable in a vertical plane, for engagement with the external teeth on a rack of the jaws. The housing may have a different shape, depending on, for example, the object to be attached or the roof rack in question, and an alternative manner of operating the rotary knob may be used. The advantage of the present invention is that the attachment device can be of compact design, that it is easily operable, that it can be used for manipulating the attachment device without taking up too much space within a roof cargo box and that its shape is substantially independent of the (sectional) shape of a roof rack in combination with which the attachment device will be used. Furthermore it is possible to attach other objects besides a roof cargo box to a roof rack, for example a bicycle box or the like. Other examples of objects to be attached to a roof rack are sufficiently well known from practice.

The invention claimed is:

1. An attachment device by means of which, in use, an object is attached to a roof rack which is or at least can be connected to roof rails of a car, comprising:
   a housing,
   at least two movable jaws extending to outside the housing, which jaws engage around a roof rack in use, and
   actuating means provided with an operating element for moving said at least two jaws together, wherein the actuating means are designed to translate the jaws and comprise at least one rack having a plurality of teeth, which rack is engaged when the operating element is operated;
   wherein the operating element comprises a rotary knob provided with engaging means which, in use, engage said at least one rack;
   wherein the rotary knob is rotatable about a substantially horizontal plane, the rotary knob comprising a spiral guide which engages said plurality of teeth of the at least one rack; and
   wherein the at least one rack is configured to move linearly in a direction normal to a rotational axis of the rotary knob.

2. An attachment device according to claim 1, wherein the rotary knob is rotatable in a substantially vertical plane, the outer circumference of said knob being provided with teeth which engage said at least one rack.

3. An attachment device according to claim 1, wherein each of said at least two jaws are connected to the at least one rack, which rack is engaged when the operating element is operated.

4. An attachment device according to claim 1, wherein spacing in horizontal direction between the jaws decreases in downward direction.

5. An attachment device according to claim 1, wherein the operating element comprises locking means by which the operating element can be locked in a desired position.

6. An attachment device according to claim 1, wherein the attachment device is designed to engage both the roof rack and an object to be attached to the roof rack with its jaws upon being placed.

7. The attachment device according to claim 1 in combination with an object which is or at least is to be attached to a roof rack which is or at least is to be connected to roof rails of a car, wherein the housing is positioned in or over the object in use and wherein the jaws of the attachment device extending through the object to below said object for engaging a roof rack.

8. A combination according to claim 7, wherein said object comprises a roof cargo box.

9. The attachment device according to claim 1 in combination of a roof rack which is or at least can be connected to roof rails of a car.

10. An attachment device by means of which, in use, an object is attached to a roof rack which is or at least can be connected to roof rails of a car, comprising:
    a housing,
    at least two movable jaws extending to outside the housing, which jaws engage around a roof rack in use, and actuating means provided with an operating element for moving said at least two jaws together, wherein the actuating means are designed to translate the jaws and comprise at least one rack, which rack is engaged when the operating element is operated;

wherein the operating element comprises locking means by which the operating element can be locked in a desired position;

wherein the operating element comprises a rotary knob provided with engaging means which, in use, engage said at least one rack;

wherein the rotary knob is rotatable about a substantially horizontal plane, the rotary knob comprising a spiral guide which engages said at least one rack; and wherein the at least one rack is configured to move linearly in a direction normal to a rotational axis of the rotary knob.

11. An attachment device according to claim 10, wherein the rotary knob is rotatable in a substantially vertical plane, the outer circumference of said knob being provided with teeth which engage said at least one rack.

12. An attachment device according to claim 10, wherein each of said at least two jaws are connected to the at least one rack, which rack is engaged when the operating element is operated.

13. An attachment device according to claim 10, wherein spacing in horizontal direction between the jaws decreases in downward direction.

14. An attachment device according to claim 10, wherein the attachment device is designed to engage both the roof rack and an object to be attached to the roof rack with its jaws upon being placed.

15. The attachment device according to claim 10 in combination with an object which is or at least is to be attached to a roof rack which is or at least is to be connected to roof rails of a car, wherein the housing is positioned in or over the object in use and wherein the jaws of the attachment device extending through the object to below said object for engaging a roof rack.

16. A combination according to claim 15, wherein said object comprises a roof cargo box.

17. The attachment device according to claim 10 in combination of a roof rack which is or at least can be connected to roof rails of a car.

18. An attachment device by means of which, in use, a cargo box is attached to a roof rack which is or at least can be connected to roof rails of a car, comprising:

a housing, at least two movable jaws extending to outside the housing, which jaws engage around a roof rack in use, and actuating means provided with an operating element for moving said at least two jaws together, wherein the actuating means are designed to translate the jaws and comprise at least one rack, which rack is engaged when the operating element is operated;

wherein the operating element comprises a rotary knob provided with engaging means which, in use, engage said at least one rack;

wherein the rotary knob is rotatable about a substantially horizontal plane, the rotary knob comprising a spiral guide which engages said at least one rack;

wherein the at least one rack is configured to move linearly in a direction normal to a rotational axis of the rotary knob; and wherein the attachment device is in combination with a cargo box which is or at least is to be attached to a roof rack which is or at least is to be connected to roof rails of a car, wherein the housing is positioned in the cargo box in use and wherein the jaws of the attachment device extend through the cargo box to below said cargo box for engaging a roof rack.

19. An attachment device according to claim 18, wherein the rotary knob is rotatable in a substantially vertical plane, the outer circumference of said knob being provided with teeth which engage said at least one rack.

20. An attachment device according to claim 18, wherein each of said at least two jaws are connected to the at least one rack, which rack is engaged when the operating element is operated.

21. An attachment device according to claim 18, wherein spacing in horizontal direction between the jaws decreases in downward direction.

22. An attachment device according to claim 18, wherein the operating element comprises locking means by which the operating element can be locked in a desired position.

* * * * *